Oct. 17, 1933.  J. KOSCH  1,931,412
CARD INDEX SYSTEM AND CARDS THEREFOR
Filed Sept. 1, 1931   5 Sheets-Sheet 1

Oct. 17, 1933.  J. KOSCH  1,931,412
CARD INDEX SYSTEM AND CARDS THEREFOR
Filed Sept. 1, 1931  5 Sheets-Sheet 2

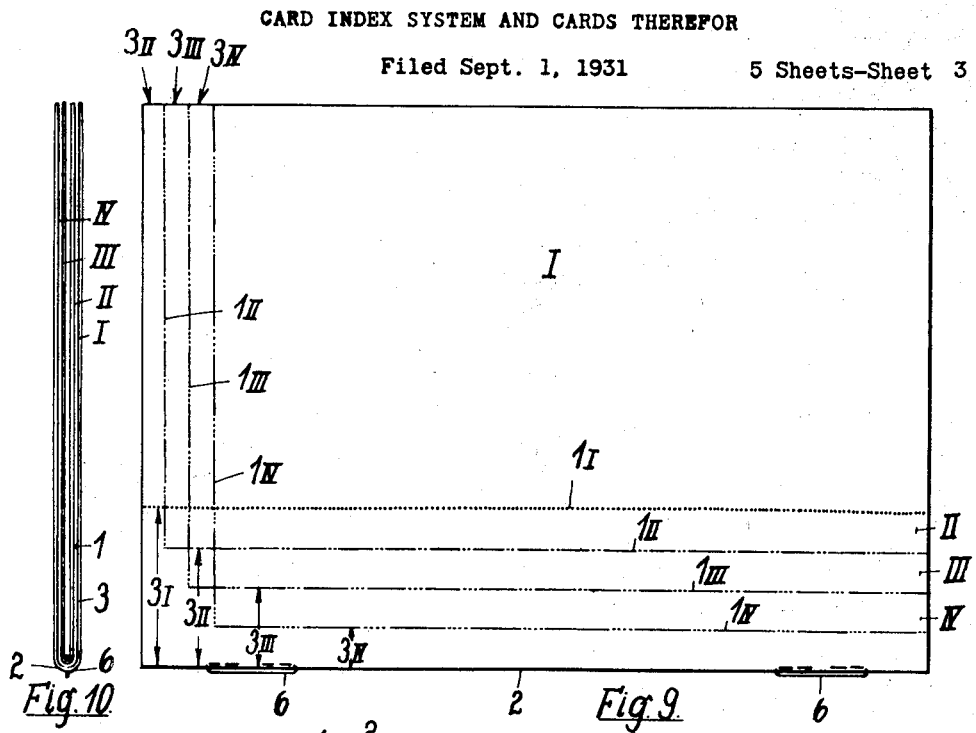
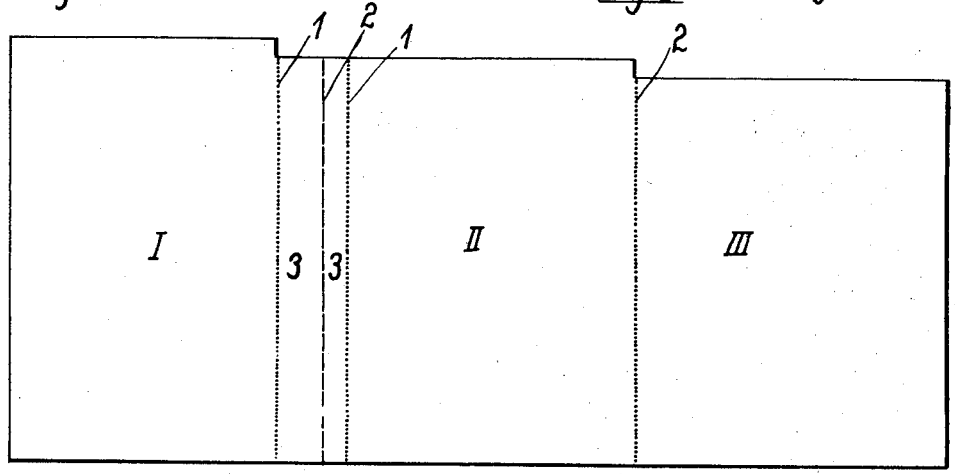
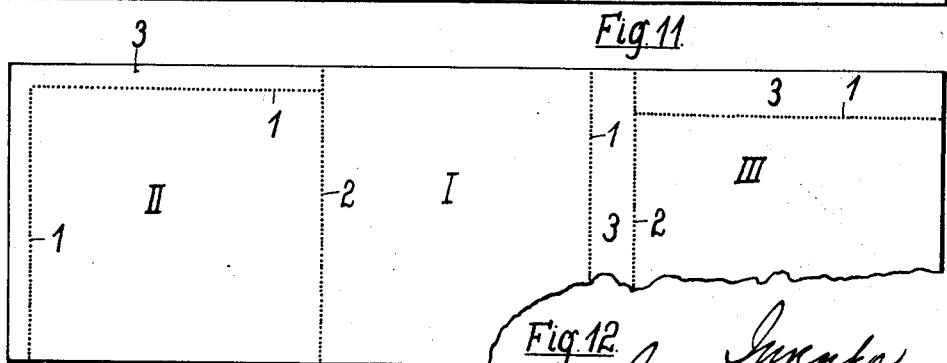

Oct. 17, 1933. J. KOSCH 1,931,412
CARD INDEX SYSTEM AND CARDS THEREFOR
Filed Sept. 1, 1931 5 Sheets-Sheet 4

Oct. 17, 1933.   J. KOSCH   1,931,412
CARD INDEX SYSTEM AND CARDS THEREFOR
Filed Sept. 1, 1931   5 Sheets-Sheet 5

Patented Oct. 17, 1933

1,931,412

UNITED STATES PATENT OFFICE 1,931,412

CARD INDEX SYSTEM AND CARDS THEREFOR

Josef Kosch, Dresden, Germany

Application September 1, 1931, Serial No. 560,628, and in Germany September 3, 1930

6 Claims. (Cl. 129—16.5)

The invention relates to card index systems of all kinds containing several card groups which it is desired to keep apart and it is one of the objects of the invention to prevent cards of the different groups from getting mixed. It has been found that in order to prevent mistakes when distributing the cards, it does not suffice to give them different colour; even if the cards are made of different size, it does not necessarily follow that they will be put into the right group when they are being sorted.

With card index systems where the cards are distributed and collected according to different points of view, e. g. with regard to names of firms, business line, residence, time etc., and where it is desired to write all cards simultaneously by means of typewriter manifolding, it may easily occur that cards are subsequently misplaced, especially if they are not immediately distributed, but perhaps left till the end of the day or for still later distribution. The same errors occur in such cases, where many cards of different signification are filled out, even if these are filled out singly.

The idea of the invention is to avoid mistakes of the kind mentioned by providing cards of different dimensions and by distributing same to form several card groups containing cards the height of which increases as the width becomes smaller and vice versa. Care must only be taken to fix the dimensions of the cards or sheets such that the height of the sheets in the one group be not equal to the width of the sheets belonging to another group and vice versa, a distinct difference in dimensions thus always remaining. If sheets dimensioned according to the idea of the invention are provided it will be quite impossible for a wrong sheet to hide and pass unnoticed into the wrong group.

One important object of the invention is to provide an improved card index system having sets of cards so arranged with respect to their widths and heights that no card of the set can be entirely hidden behind another card of the set.

A second important object of the invention is to provide a set of index card sheets of uniform dimensions but having index cards defined from the several sheets by tear lines so arranged that upon separation of the cards from the sheet, such cards will form a set wherein no card of the set can be entirely hidden behind any other card of the set.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 9 is a face view of two sheets each having two cards thereon when folded and assembled.

Figure 10 is an end view of the device as shown in Figure 9.

Figure 11 is a face view of a modified form of the device having a single sheet foldable to provide three cards.

Figure 12 is a face view of a modification of the form shown in Figure 11.

In the form of the invention shown in Figures 1 to 5, a set of four cards is seen, these cards being indicated respectively at I, II, III and IV and it will be noted that in the order named each card is narrower and higher than the preceding card. Obviously, if a taller and narrower card is placed in front of a shorter and wider card, the latter will project from behind the former at one or both sides. On the contrary, if the taller and narrower card is placed behind the other, it will project thereabove. Under such conditions, it will be plain that if in a pile of such cards, for instance, as that shown at II, one of the other cards of a set be placed, its presence will be immediately noticeable and cannot be concealed. With cards arranged in this manner, it is thus impossible for a card belonging to one filing group to be hidden among cards belonging to another filing group; it being understood that each group is to contain only cards of the same dimensions. It is to be noted that while the set disclosed in Figures 1 to 5 consists of only four cards, the number of cards in a set may be increased or diminished by carrying out the same arrangement for whatever the number in the set.

Figure 1:
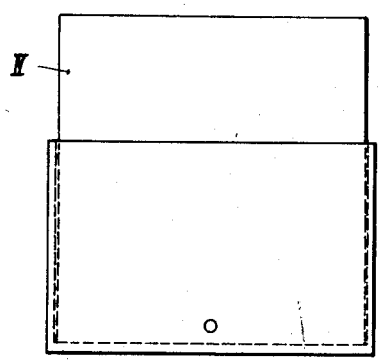
Figure 1 is an end view of a drawer or box having one card of a set therein.
Figure 2:
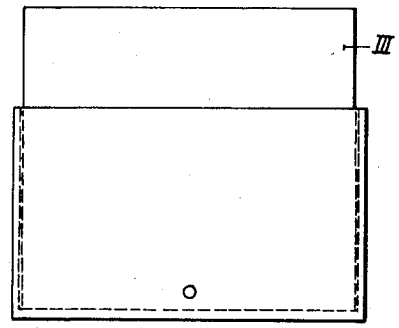
Figure 2 is a similar view showing the second card of the set.
Figure 3:
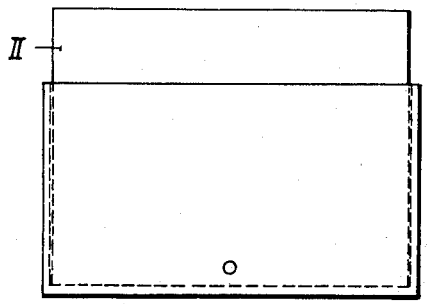
Figure 3 is a similar view showing the third card of the set.
Figure 4:
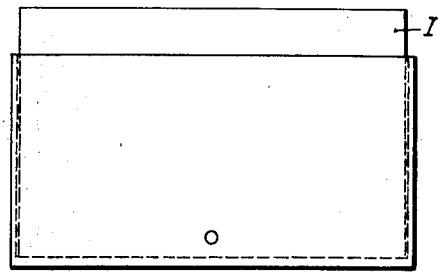
Figure 4 is a similar view showing the fourth card of the set.
Figure 5:
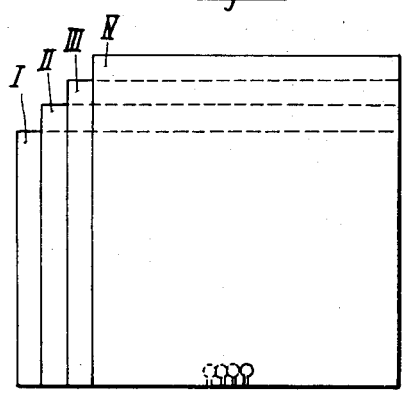
Figure 5 is a face view of a set of the cards grouped together.
Figure 6:
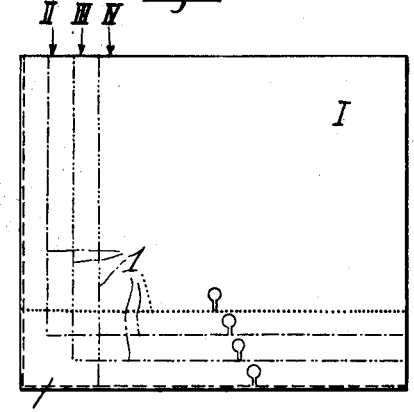
Figure 6 is a face view of a set of four card sheets of uniform dimensions but having the sheets provided with tear lines to define cards of the kind forming this invention.

In order to render it easy to employ manifolding methods for example on a typewriter, etc. it is desirable to have the pieces handled all of the same size so that all of the edges of each piece may be made even with the corresponding edges of the remaining pieces. To this end, the form shown in Figure 6 may be employed. In this form, the cards are numbered as before but the cards are formed from sheets, each as wide as the widest card and as tall as the tallest card, each card being defined from its sheet by one or more perforated or otherwise weakened lines 1, the cards thus defined being successively taller and narrower as before. Thus each sheet includes a main or card portion and a waste portion 3 which, after the typewriting operation is complete, is torn off so that the set of cards remaining correspond to those shown in Figure 5.

Figure 7:
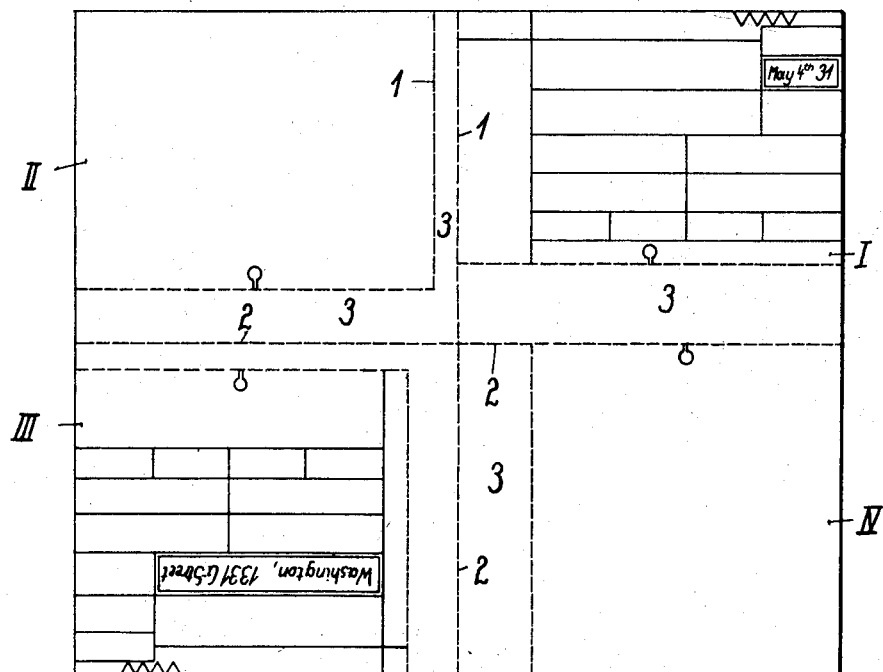
Figure 7 is a view of one face of a large sheet foldable to provide a set of sheets similar to Figure 6.
Figure 8:
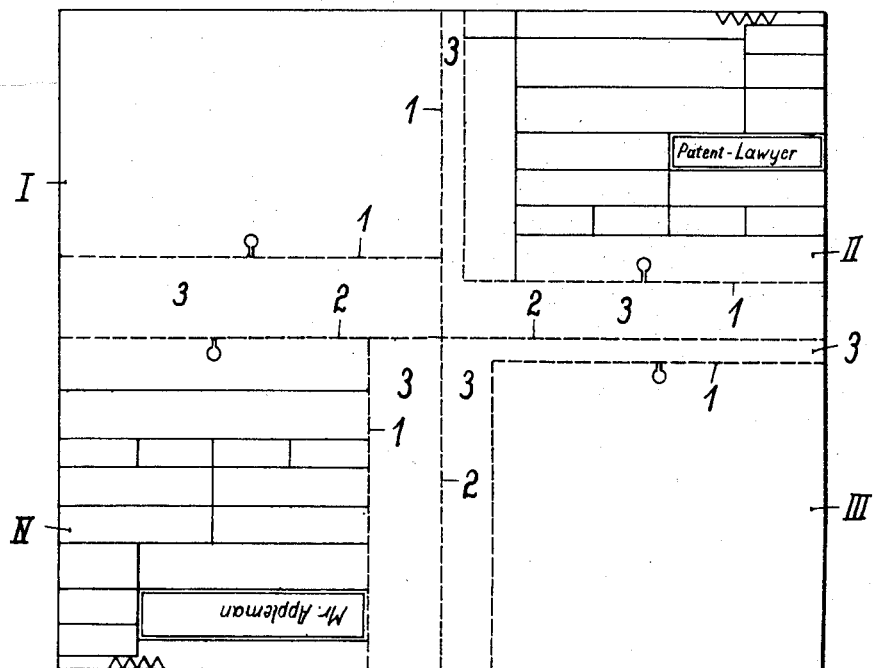
Figure 8 is a view of the other face of the sheet shown in Figure 7.

The form of the invention shown in Figures 7 and 8 discloses a modification wherein all four cards of a set are included in a single sheet divided by vertical and horizontal medial fold lines 2 into four equal parts each having one of the cards thereon. In this form, two of the cards are printed at the diagonally opposite corners of one face of the sheet, while the remaining cards are printed on the opposite side of the sheet in the remaining corners so that when folded, the card forms lie in superposed relation. In these figures the cards, tear lines and waste are indicated as before.

In the form shown in Figures 9 and 10, two sheets are employed, one for the cards I and IV and the other for the cards II and III. These sheets are assembled as in Figure 10 and held by paper staples 6 in assembled relation. It will be noted that in these figures the numerals 1 and 3, indicating the tear lines and waste respectively, have the Roman card numbers annexed.

In Figure 11, a three-card sheet is shown wherein one edge of the sheet is shown as stepped to provide for different heights, the sheet being divided into three sections of equal widths by fold lines 2 and provided with the usual tear lines 1 and waste portions 3.

The form of Figure 12 is much similar to Figure 11, but the sheet is of uniform height throughout, the heights of the cards being determined by certain of the tear lines 1. This form has the usual fold lines 2 and waste portions 3.

Figure 13:
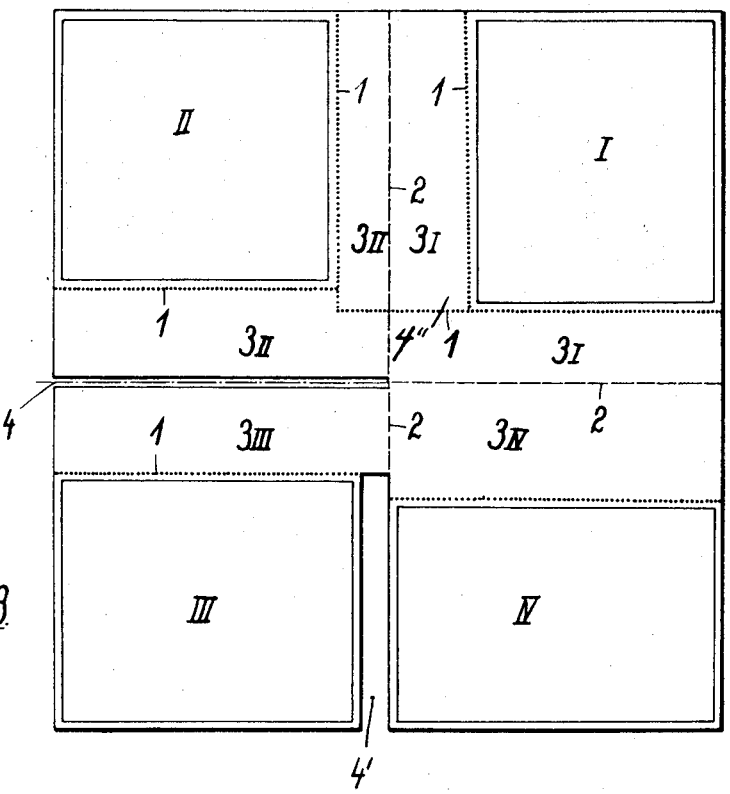
Figure 13 is a face view of a further modified form.

Figure 13 shows a modification wherein four cards are arranged at the corners of a rectangular sheet which is partly severed along medial fold lines 2 by slots 4 and 4' to make for more easy folding and rolling through the typewriter.

Figure 14:
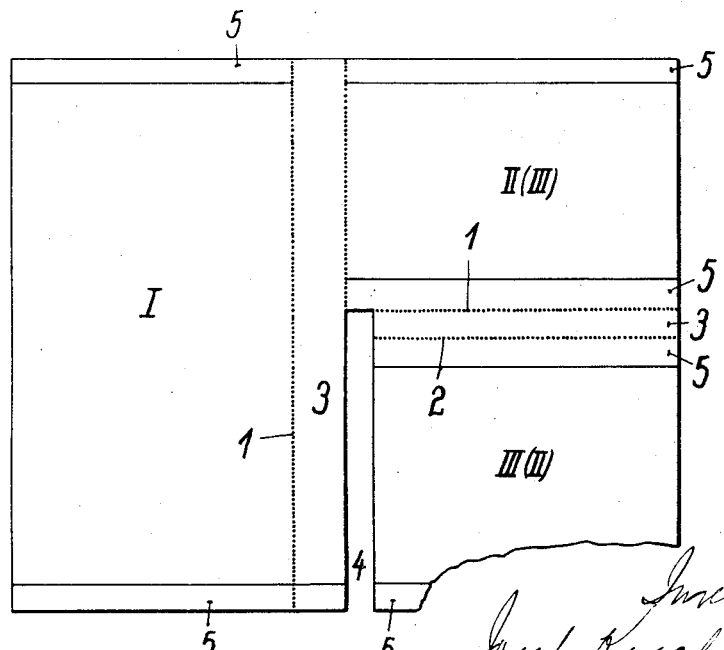
Figure 14 is a face view of another modification for three cards.

Figure 14 is a modification of the form of Figure 13 for three cards, two occupying adjacent corners and the third extending along the entire side opposite thereto. This form has its cards provided with gummed edge portions 5 which may be doubled over to reinforce the edges to which they are attached.

Figure 15:
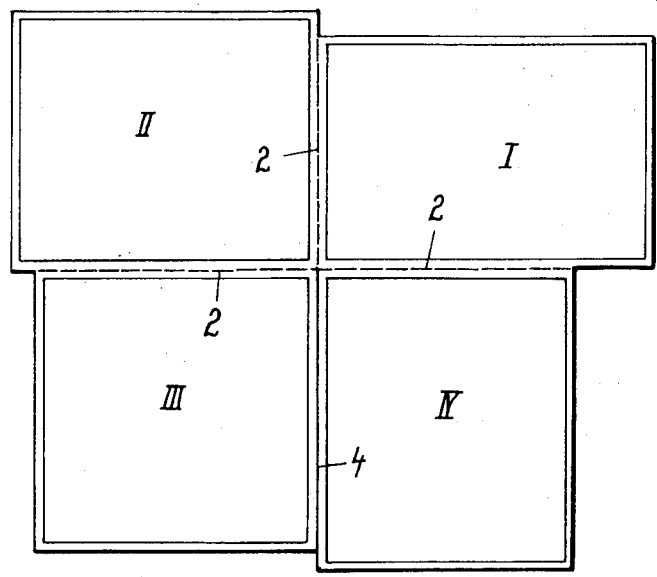
Figure 15 is a face view of a still further modification of a four card set arrangement.

In the form shown in Figure 15, the edges of the sheet are stepped and the cards meet at adjacent edges on lines at right-angles to each other one of which is a fold and tear line 2 and the other of which is formed partly by a fold and tear line 2 and partly by a slit 4. In this form, there are no waste portions, due to the outline of the sheet.

Figure 16:
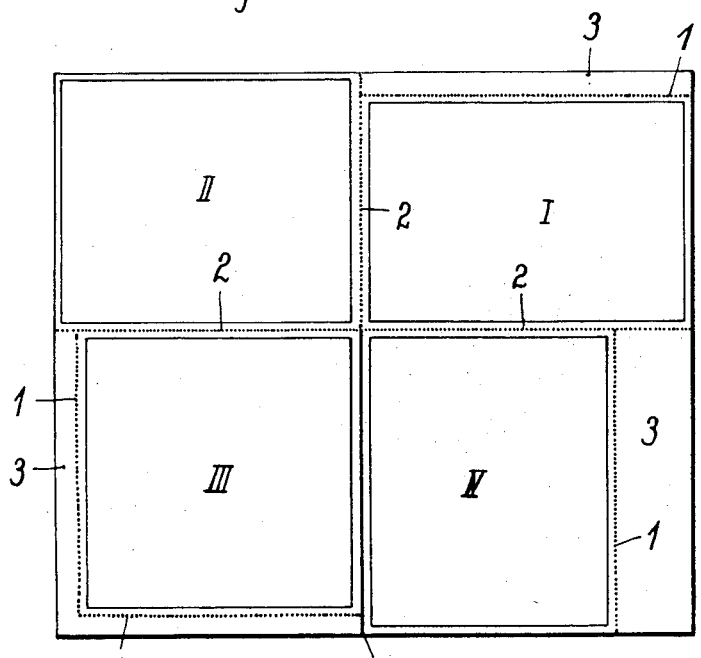
Figure 16 shows the arrangement of Figure 15 when the card sheets are all of the same size.

Figure 16 is much like Figure 15 but the sheet is rectangular and waste portions 3 are defined from the cards by tear lines 1.

It is to be understood that although these devices are here referred to as "cards", this term is intended to include letter sheets, printed forms, business papers and the like.

While in the form shown in Figs. 9 and 10 the sheets are assembled and held by paper staples, it is to be understood that the sheets assembled as in Fig. 10 may be held by clamps, glue, sewing or the like.

I claim:

1. In a card index system, a set of cards for grouping data, each consisting of a rectangular sheet, the sheets in the set being successively of decreasing length and increasing height throughout the set.

2. In a card index system, a set of cards for grouping data comprising primary rectangular sheets of equal length and height and having rows of perforations on the several sheets positioned to define on each sheet a record card, the positions of the rows of perforations increasing by consecutive steps from one vertical edge of the several sheets throughout the set and decreasing by consecutive steps from one horizontal edge of the several sheets throughout the set whereby to define a set of index cards of successively decreasing lengths and successively increasing heights.

3. In a card index system, a set of cards for grouping data each consisting of a rectangular sheet, the sheets in the set being successively of decreasing length and increasing height throughout the set, and means to hold the sheets together in regular order in the set.

4. In a card index system, a set of cards for grouping data comprising primary rectangular sheets of equal length and height and having rows of perforations on the several sheets positioned to define on each sheet a record card, the positions of the rows of perforations increasing by consecutive steps from one vertical edge of the several sheets throughout the set and decreasing by consecutive steps from one horizontal edge of the several sheets throughout the set whereby to define a set of index cards of successively decreasing lengths and successively increasing heights, and means to hold the sheets together in regular order in the set.

5. In a card index system, a set of cards for grouping data each consisting of a rectangular sheet, the sheets in the set being successively of decreasing length and increasing height throughout the set, said sheets having certain of their marginal edges united and the sheets being folded in regular order along said united edges.

6. In a card index system, a set of cards for grouping data comprising primary rectangular sheets of equal length and height and having rows of perforations on the several sheets positioned to define on each sheet a record card, the positions of the rows of perforations increasing by consecutive steps from one vertical edge of the several sheets throughout the set and decreasing by consecutive steps from one horizontal edge of the several sheets throughout the set whereby to define a set of index cards of successively decreasing lengths and successively increasing heights, said sheets having certain of their marginal edges united and the sheets being folded in regular order along said united edges.

JOSEF KOSCH.